(12) United States Patent
Blake

(10) Patent No.: US 10,291,668 B2
(45) Date of Patent: May 14, 2019

(54) AUDIO MIXER

(71) Applicant: Cisco Technology, Inc., San Jose, CA (US)

(72) Inventor: Mark Blake, Buckinghamshire (GB)

(73) Assignee: Cisco Technology, Inc., San Jose, CA (US)

( * ) Notice: Subject to any disclaimer, the term of this patent is extended or adjusted under 35 U.S.C. 154(b) by 158 days.

(21) Appl. No.: 15/129,047

(22) PCT Filed: Apr. 8, 2015

(86) PCT No.: PCT/GB2015/051069
§ 371 (c)(1),
(2) Date: Sep. 26, 2016

(87) PCT Pub. No.: WO2015/155524
PCT Pub. Date: Oct. 15, 2015

(65) Prior Publication Data
US 2017/0111408 A1     Apr. 20, 2017

(30) Foreign Application Priority Data

Apr. 8, 2014   (GB) .................................. 1406301.0

(51) Int. Cl.
*H04L 29/06*     (2006.01)
*G10L 19/008*    (2013.01)
(Continued)

(52) U.S. Cl.
CPC .......... *H04L 65/403* (2013.01); *G10L 19/008* (2013.01); *G10L 19/018* (2013.01);
(Continued)

(58) Field of Classification Search
None
See application file for complete search history.

(56) References Cited

U.S. PATENT DOCUMENTS

2002/0119758 A1 *  8/2002  Gouillou .............. G08G 5/0008
                                                                455/74
2008/0034161 A1 *  2/2008  Savell ..................... G10L 21/00
                                                                711/118
(Continued)

FOREIGN PATENT DOCUMENTS

JP           06168575          6/1994

OTHER PUBLICATIONS

International Search Report and Written Opinion in International Application No. PCT/GB2015/051069, dated Jul. 15, 2015, 11 pages.

(Continued)

*Primary Examiner* — Richa Mishra

(57) ABSTRACT

An audio mixer for mixing audio signals from a plurality of participants, including audio signals of different sample rates; the audio mixer comprising: a plurality of mixing arrangements, each mixing arrangement for a given one of said sample rates; each mixing arrangement comprising: a pre-mixer configured to mix audio signals having the given sample rate; one or more resamplers, each resampler configured to convert pre-mixed audio signals from other mixing arrangements into a signal of the given sample rate; and a post-mixer configured to mix the output of the pre-mixer with the output of each resampler to produce an output at the given sample rate; the audio mixer further comprising a subtractor configured to subtract the participant's input audio signal from the post-mixed output.

20 Claims, 3 Drawing Sheets

(51) Int. Cl.
   *G10L 19/018*   (2013.01)
   *G10L 19/24*    (2013.01)
   *H04M 3/56*     (2006.01)

(52) U.S. Cl.
   CPC ............ *G10L 19/24* (2013.01); *H04M 3/568* (2013.01); *H04M 2201/22* (2013.01)

(56) References Cited

U.S. PATENT DOCUMENTS

| | | |
|---|---|---|
| 2009/0196438 A1 | 8/2009 | Jeong et al. |
| 2010/0290645 A1 | 11/2010 | Ito et al. |
| 2010/0296675 A1* | 11/2010 | Ito .................... H04M 3/568 381/119 |
| 2012/0213346 A1* | 8/2012 | Gao ................. H04M 3/42017 379/93.01 |
| 2012/0308014 A1* | 12/2012 | Pallapothu ........... G11B 27/034 381/17 |

OTHER PUBLICATIONS

Triebel et al., "Peer-to-Per Voice Communication for Massively Multiplayer Online Games," 2009 6th IEEE Consumer Communications and Networking Conference, Jan. 10, 2009, 5 pages.
Search Report in Application No. GB1406301.0, dated Oct. 3, 2014, 4 pages.

* cited by examiner

AUDIO MIXER

FIELD OF THE INVENTION

The present invention relates to an audio mixer, in particular an audio mixer for mixing audio signals with a range of sample rates.

BACKGROUND OF THE INVENTION

Conference calls are a common way of enabling virtual meetings to be held between remote participants. During a conference call between remote participants on a variety of devices, the quality of the audio signal is incredibly important regardless of whether the conference call is audio-only, a video conference, or a combination of both.

With improving technology, the variety of devices used by different participants to access virtual meetings has increased. Different participants of a single virtual meeting or conference call may for example use one or more of a smartphone, tablet, laptop, video endpoint or Lync client to access the meeting.

The purpose of a network audio mixer is to enable audio conferencing functionality between the participants.

Each participant of the meeting will contribute an audio stream via the microphone of their chosen device. This audio stream will be compressed locally resulting in a stream of Real-time Transport Protocol (RTP) packets.

This is usually achieved by way of a standard audio codec such as G.722 or AAC-LD. However, different audio generating/receiving devices are likely to use different audio sample rates. For example, a high-end video conference suite is likely to be configured to send and receive higher sample rates than a mobile phone. Typically audio compression standards in voice-over internet protocol (VOIP) will use sample rates such as 8, 16, 32 and 48 Khz.

The audio mixer will mix the packets from all of the participants, and will send back to each participant a stream of compressed audio packets which enable the participant to hear every other participant in the conference apart from themselves.

A schematic diagram of an example of a conventional audio network mixer 10 is shown in FIG. 1. Each participant generates an audio stream which must be decoded by a decoder 1a, 1b, 1c for that audio stream before the audio signals can be mixed. Each audio stream may use a different sample rate and different audio codec.

Generally, each audio signal therefore also needs to be resampled to a common format prior to mixing. Each audio stream will therefore pass through a resampler 2a, 2b, 2c. Once fully decoded and converted (resampled) into a common format, the resampled signals are mixed together in a single mixer 3. Usually, the common format used for mixing corresponds to the highest sample rate used by any of the participants.

For each participant, their own resampled input signal is then subtracted from the mixed signal to produce an output which must then be converted back (resampled) into a suitable format to be encoded by a separate encoder 6a, 6b, 6c for each participant.

In the example shown in FIG. 1, each decoder may be located after a jitter buffer 7a, 7b, 7c.

For a conference with N participants, a conventional audio mixer such as that of FIG. 1 requires up to N decodes, 2N audio resamplings, and N encodes. Thus, each "audio path" through the mixer (from the audio signal sent out by a participant to the audio signal they receive back) typically gets resampled twice which can lead to a loss of quality. In addition, resamplers are expensive components which demand a high computational load.

SUMMARY OF THE INVENTION

The present invention seeks to address the disadvantages associated with the prior art above by providing, according to a first aspect, an audio mixer for mixing audio signals from a plurality of participants, including audio signals of different sample rates; the audio mixer comprising: a plurality of mixing arrangements, each mixing arrangement for a given one of said sample rates; each mixing arrangement comprising: a pre-mixer configured to mix audio signals having the given sample rate, one or more resamplers, each resampler configured to convert pre-mixed audio signals from other mixing arrangements into a signal of the given sample rate; and a post-mixer configured to mix the output of the pre-mixer with the output of each resampler to produce an output at the given sample rate; the audio mixer further comprising a subtractor configured to subtract the participant's input audio signal from the post-mixed output.

In this way, by binning the audio signals from participants depending on their sample rate, a dynamic audio mixer is provided which is capable of self-collapsing to work at the optimum setting at a given time for the number of audio sample rates present in the system (which in turn depends on the range of audio codecs that are inputted at a given time).

The self-collapsing capability is preferably automatic in that the audio mixer may include a means for flagging packets of audio signals with a "mix indicator", the means for flagging the audio signals being located before the pre-mixer of the mixing arrangement. The "mix indicator" may be a flag which indicates that the audio signal should be mixed or may be a flag which indicates that the audio signal should not be mixed. If all of the audio inputs having a given sample rate are flagged as "do not mix" (if, for example they correspond to "null" signals; muted participants; or quiet participants to be filtered out in order to reduce noise), the mixing arrangement for that given sample rate will not process any information i.e. the audio mixer will "self-collapse" to avoid any unnecessary processing at that sample rate. In addition, the audio mixer of the present invention advantageously reduces the number of resampling steps that each stream of audio data is subjected to. Since resampling leads to a loss in quality, the audio mixer of the present invention results in an improvement in audio quality.

The number of resamplers of the audio mixer of the present invention is dependent upon the number of sample rates, M rather than the number of participants, N. This is particularly advantageous when more than 4 participants are present.

For a conventional network mixer such as that shown in FIG. 1, sampling must be carried out at the highest supported sample rate, even if no participants operating at that sample rate are actually participating. In the present invention there is no requirement for such unnecessary re-sampling.

Optional features of the invention will now be set out. These are applicable singly or in any combination with any aspect of the invention.

Preferably, the audio mixer further comprises a selection arrangement configured to select a post-mixed output for a participant corresponding to an output sample rate chosen by the participant.

The sample rate "chosen" by the participant will correspond to the sample rate of the audio codecs supported by the participant's device and is usually automatic. The sample rate of the participants input audio signal will usually have the same sample rate as the output audio signal/stream which is returned. However, this may not always be the case. For example, asymmetric audio streams may be required where the network used by the participant is itself asymmetric.

The "choice" of sample rate made by the participant's device may vary over the time of the conference call. For example, deterioration of the network used by the participant or a fault in the device could cause the device to utilise an audio codec with a greater redundancy and a different sampling rate.

The dynamic nature of the audio system means that it is able to adapt during use, to the demands of the participants as they change over the duration of the conference. In particular to any change in the audio codec selection or "choice" by the participant throughout the call. If a change in the audio codec results in a change in the sample rate of audio packets the signal will be routed via the decoder to a different pre-mixer. This may mean that extra or fewer processing steps are required depending on the sample rates of the audio codecs used by all of the other participants.

Preferably, the selection arrangement comprises a mix selector located before the subtractor; the mix selector configured to receive the output of each post-mixer of the audio mixer and to select the post-mixed signal which corresponds to the output sample rate chosen by the participant.

Preferably, the audio mixer comprises a further resampler located before the subtractor, the further resampler configured to convert the participant's input signal from the input sample rate to the output sample rate if the participant chooses an output sample rate which is different to their input sample rate.

This means that each constituent audio stream is resampled either once or not at all. This differs from the conventional audio mixer described above in relation to FIG. 1 in which each constituent audio stream is always resampled twice.

In the audio mixer of the present invention, where the sample rates of input and output audio signals used by a participant are symmetric, the audio stream will not include a resampling step. Where the sample rates of input and output audio signals are not symmetric, each component of the audio stream will only have experienced one resampling step.

When there are N participants using a total of M different sample rates; the total number of resamplers is no less than M(M−1) and no more than M(M−1)+N.

Preferably, the audio mixer further comprises a means for categorising a plurality of audio input signals into a plurality of categories, each category corresponding to a supported sample rate.

Preferably, the means for categorising a plurality of audio input signals includes a plurality of decoders. The sample rate of each decoded audio signal is known because it is determined by the compression standard used and the decoded outputs of the decoders are routed to the pre-mixer for the corresponding supported sample rate.

Preferably there is one decoder per participant input.

The means for flagging the audio signals with a "mix indicator" may form part of the means for categorising the audio signals e.g. the decoder.

Preferably there is one pre-mixer for each supported sample rate and one post-mixer for each supported sample rate.

Optionally, the audio mixer further comprises a means for assigning a relative volume to one or more audio signals before the signal reaches the pre-mixer.

Preferably, the different sample rates supported by the system include one or more of: 8 Khz, 16 Khz, 32 Khz, 48 Khz.

According to a second aspect of the present invention, there is provided a method of mixing audio signals from a plurality of participants including audio signals of different sample rates, the method including the steps of: mixing the audio signals from the plurality of participants according to their sample rate by: pre-mixing audio signals of each sample rate at a sampling-rate specific pre-mixer to give a separate pre-mixed output for each sample rate present; re-sampling each pre-mixed output from its sample rate into resampled outputs of each one or more other sample rates present; post-mixing each pre-mixed output with each of the one or more resampled signal outputs which have been converted into the same sample rate to generate a separate post-mixed output for each sample rate the method further comprising the step of subtracting the participant's input audio signal from the post-mixed output.

The advantages and preferable features discussed in relation to the first aspect apply to the corresponding method which forms the second aspect. In particular:

Preferably, the method further comprises the step of selecting a post-mixed output corresponding to an output sample rate chosen by the participant.

Preferably a mix selector chooses the post-mixed output corresponding to the output sample rate chosen by the participant before the participant's input audio signal is subtracted.

Preferably, the participant's own audio input is resampled to the output sample rate chosen by the participant before subtraction if the participant's chosen output sample rate is different from the participant's input sample rate.

Preferably, the method further comprises a step of flagging the audio signal of a participant with a mix indicator, before the audio signal reaches the mixing step.

Preferably, the method further comprises the step of categorising a plurality of audio input signals into a plurality of categories, each category corresponding to a supported sample rate.

Preferably, the step of categorising the plurality of audio input signals includes decoding each audio signal and based on the sample rate of the decoded signal, routing each decoded signal to the pre-mixer for signals of that sample rate.

The means for flagging the audio signals with a "mix indicator" may form part of the characterisation stage. As the software of the audio mixer loops through each decoder it may assign each packet with a "mix indicator" flag as well as a flag which indicates the sample rate of the signal and therefore determines to which pre-mixer the audio signal is routed.

Preferably the method further comprises the step of assigning a relative volume to one or more audio signals before the signal reaches the pre-mixer.

Preferably the different sample rates supported by the method include one or more of: 8 Khz, 16 Khz, 32 Khz, 48 Khz.

Further optional features of the invention are set out below.

BRIEF DESCRIPTION OF THE DRAWINGS

Embodiments of the invention will now be described with reference to the accompanying drawings in which.

DETAILED DESCRIPTION AND FURTHER OPTIONAL FEATURES OF THE INVENTION

Figure 2:
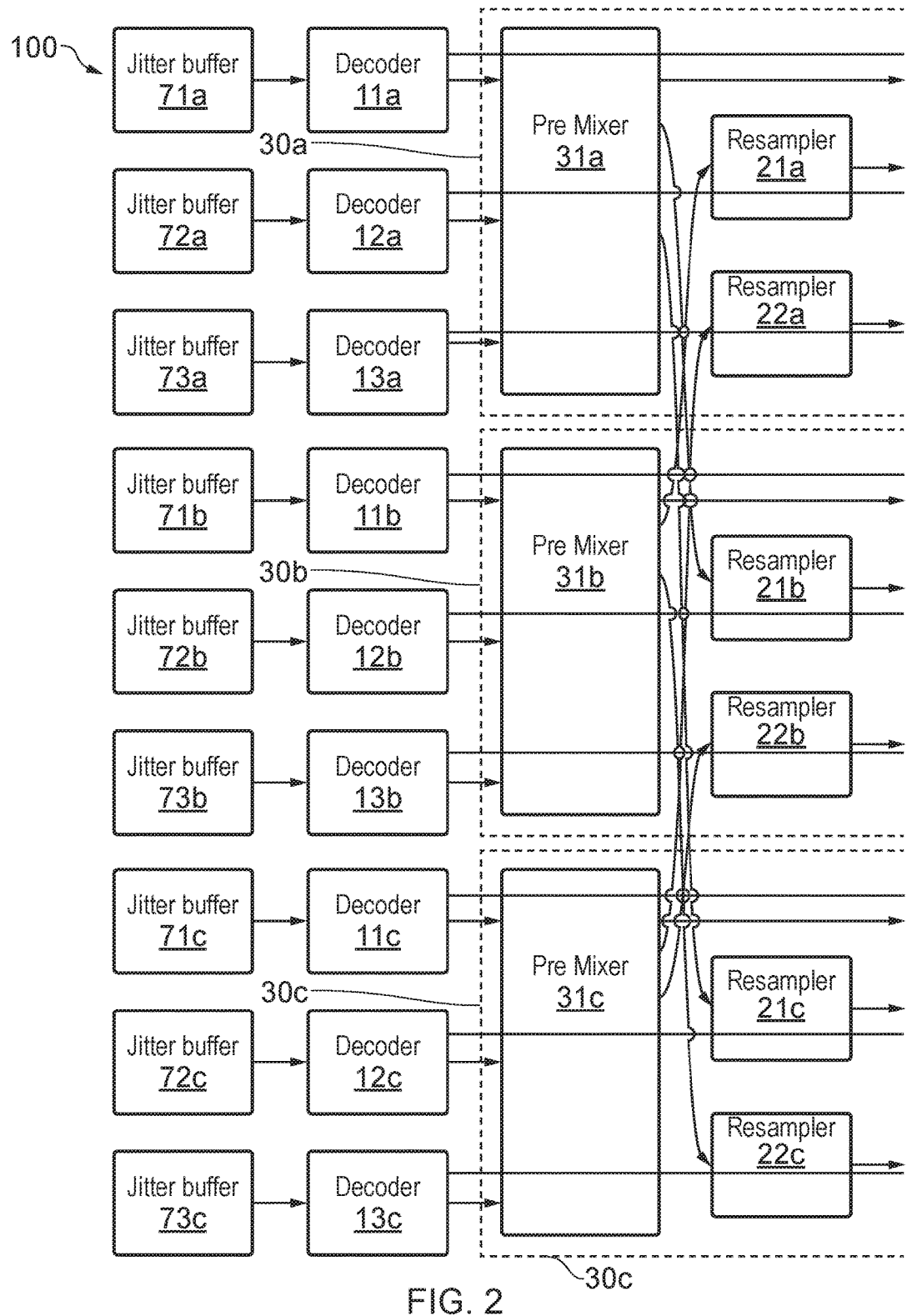
FIG. 2 shows a schematic of an audio mixer according to the present invention.
Figure 2:
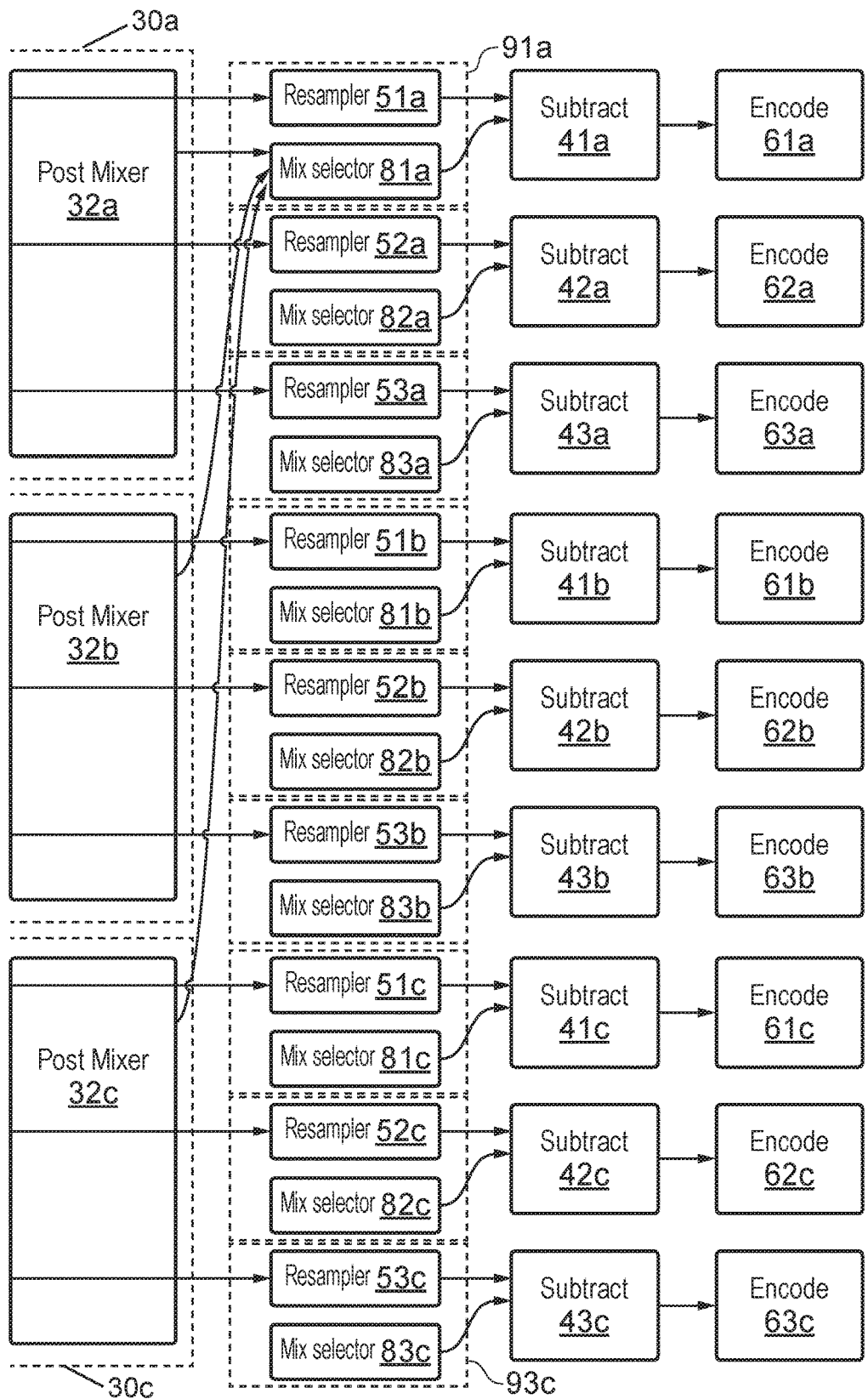

An audio mixer, specifically a network audio mixer according to the present invention is shown in FIG. 2.

The audio mixer 100 is made up of a plurality of mixing arrangements 30a, 30b, 30c each of which mix audio signals of a particular sample rate. The audio mixer shown in FIG. 2 includes three separate mixing arrangements: a first pre-mixer, second pre-mixer and a third pre-mixer. However, would be clear to the skilled person that a corresponding audio mixer could be made with only two separate mixing arrangements, or with four or more mixing arrangements.

Each mixing arrangement 30a, 30b, 30c corresponds to a given sample rate such as 8, 16, 32 or 48 KHz and comprises a pre-mixer 31a, 31b, 31c which is configured to mix audio signals having that given sample rate. For example, if the first mixing arrangement 30a corresponds to a mixing arrangement for audio signals having a first sample rate of 8 KHz, the corresponding first pre-mixer will mix only audio signals having a sample rate of 8 KHz. In fact, in the embodiment shown in FIG. 2, each pre-mixer is configured to mix all of the audio input signals with its given sample rate and only the audio signals with that given sample rate.

After pre-mixing by the pre-mixers 31a, 31b, 31c of each mixing arrangement 30a, 30b, 30c, the output of each of the pre-mixers is converted to If there are M sample rates supported by the audio mixer system, each mixing arrangement 30a, 30b, 30c will include M−1 resamplers 21a, 21b, 22a, 22b, 23a and 23b, each resampler being configured to convert the pre-mixed signal at its input into an audio signal of one of the other one or more sample rates present (i.e. one of the other sample rates used by one or more of the participants of the meeting).

Each mix arrangement 30a, 30b, 30c also includes a post-mixer 32a, 32b, 32c located after the pre-mixer and after the resamplers. Each post-mixer is configured to mix the output of the corresponding pre-mixer 31a, 31b, 31c together with the output of each resampler that produces an output converted into the given sample rate. The produced a mixed output containing all of the audio streams entered into the audio mixer 100.

For example, in the embodiment shown in FIG. 2, the first mix arrangement 30a includes: a first pre-mixer 31a which pre-mixes audio signals having a first given sample rate; two re-samplers 21a, 22a which convert each of the pre-mixed signals of other sampling rates into pre-mixed signals of the first given sample rate; and a first post-mixer 32a which mixes the output of the first pre-mixer 31 with the output of both of the resamplers, to produce an output at the first given sample rate.

For each participant, the audio mixer 100 also includes a subtractor 41a, 42a, 43a, 41b, 42b, 43b, 41c, 42c, 43c located after the post-mixer. Each subtractor subtracts the participants own input signal from the post-mixed output.

For each participant (i.e. in each "audio stream") the audio mixer 100 also includes a selection arrangement (e.g. 91a and 93c) located between the post-mixers and the subtractor of that audio stream. Each selection arrangement is made up of a mix selector 81a, 82a, 83a, 81b, 82b, 83b, 81c, 82c, 83c and a resampler 51a, 52a, 53a, 51b, 52b, 53b, 51c, 52c, 53c. The outputs of each post-mixer of the audio mixer are input into each mix selector and the mix selector is configured to select which post-mixed signal is sent to the subtractor based on which sample rate the participant requires.

The purpose of the resampler 51a, 52a, 53a, 51b, 52b, 53b, 51c, 52c, 53c located within the selection arrangement is to convert the sample rate of the participant's own input signal if required. This pre-subtraction resampler will only be necessary if the output required by the participant is different to their input.

The output of this pre-subtraction resampler is then routed to the subtractor where it is subtracted from the post-mixed signal which has been chosen by the mix selector 81a, 82a, 83a, 81b, 82b, 83b, 81c, 82c, 83c.

Figure 1:
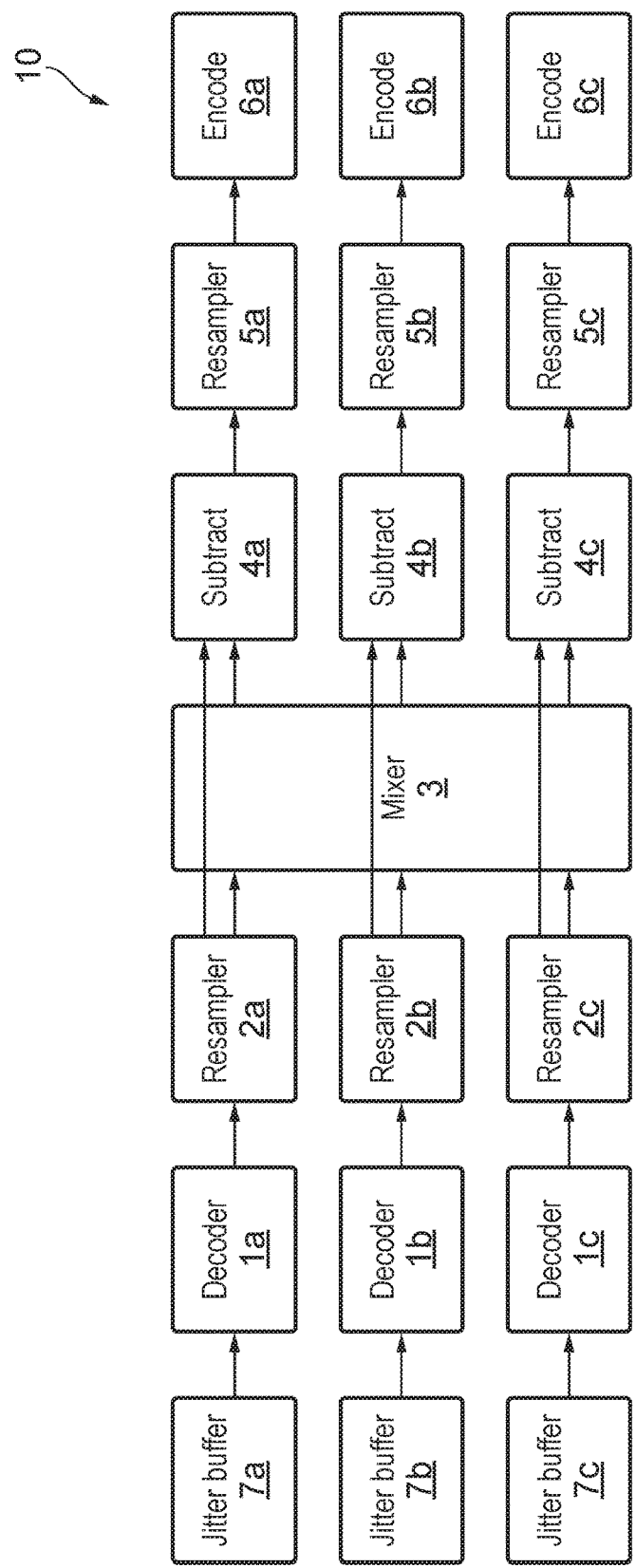
FIG. 1 shows a schematic of a prior art audio mixer as described above.

As with the conventional audio mixer shown in FIG. 1, the audio mixer of the present invention decodes the audio signals from the participants before mixing and re-encodes the resultant mixed output signals. In the embodiment shown in FIG. 2 each audio stream includes a separate decoder 11a, 12a, 13a, 11b, 12b, 13b, 11c, 12c, 13c before the relevant pre-mixer and each audio stream includes a separate encoder 61a, 62a, 63a, 61b, 62b, 63b, 61c, 62c, 63c after the corresponding subtractor of that audio stream 41a, 42a, 43a, 41b, 42b, 43b, 41c, 42c, 43c.

As well as decoding the audio input signal from the participant, the decoder acts as a means for categorising the plurality of audio input signals into categories corresponding to their sample rate. Thus, at the decoding stage, the audio input signals are sorted before being routed to the relevant pre-mixer for that given sample rate. The decoder may be configured to tag the audio signal with metadata labelling it with its the sample rate.

Each audio signal is passed through a Jitter buffer before it reaches the decoder.

The audio mixer 100 may include a means (not shown) for assigning a volume tag to an audio signal as it passes through the "audio stream". This means for assigning a volume tag is preferably located before the mixing arrangement so that the mixing arrangement(s) can be configured to process audio signals depending upon their volume tag. For example, the mixing arrangement may be configured to process only the audio signals which are above a cut-off point, the cut-off point for example being a rank position relative to the volume of the other audio signals in other streams.

Such volume-based filtering is particularly useful where there are a large number or users (e.g. 4 or more users). By filtering out all but the loudest participants at any given time the unwanted noise is reduced. The participants which fall within the loudest and are not filtered out will change constantly during the call as the conversation shifts from some participants to others. As the loudest participants change, the sample rates of the audio input signals may change. The dynamic nature of the audio mixer of the present invention means that no re-configuration of the system is necessary, the system will automatically adjust and process the signals via the relevant mixing arrangements for the sample rates present.

Audio signals are naturally split into packets of audio data, for example packets of 20 ms duration that will be processed by the software of the audio mixer.

In use the audio mixer is run periodically and there are three main software loops via which the packets of data are processed. Other loops may also be included to add extra features. The periodicity of the audio mixer is usually chosen to run at the same rate so that the audio data is processed in "chunks" which correspond to the duration discrete packets of the audio data from the participants. It is possible to calibrate an audio mixer to operate at higher or lower periodicities, higher periodicities (lower chunk size) reducing latency and lower periodicities (greater chunk size) increasing efficiency. However, there is no advantage to using a periodicity which is less than the duration of the audio packets which are input into the decoder (which in turn depends on the audio codec used by the participants).

The first of the three main loops occurs at the decoder stage. At this stage, the audio signals arrive in discrete packets of audio data (e.g. 20 ms long). The software will iterate through each decoder at which point each input is characterised by its sample rate and routed to the pre-mixer corresponding to that sample rate.

As described above, each pre-mixer mixes all of the audio signals having the given sample rate. The pre-mixing step comes before any resampling steps.

The second main loop of the software corresponds to a "cross resample" phase where each pre-mixed stream is resampled to each other sample rate and the results are mixed to produce final streams at each sample rate. The software iterates through each post-mixer, at each iteration performing this mixing of the output of the pre-mixer of a given sample rate with the output of any of the one or more resamplers which have converted another pre-mixed signal into the given sample rate.

The number of steps that must be carried out by each post-mixer (e.g. the number of resampling operations) depends on the number of sample rates present, M not on the number of participants present, N.

The third main loop of the software occurs at the output of the system at which point the software iterates through each output generating an output audio signal/output stream for each participant. At this point, the post-mix output with the appropriate sample rate (i.e. that chosen by the participant) is selected and the input stream is resampled if required and subtracted off. In this last step the input stream is only resampled if required i.e. if the input and output sample rates for a participant are different, which is typically not the case as most conference participants use symmetric audio codecs (the same audio codec for transmit and receive).

Other software loops may, for example, include the step of ordering the audio signals by relative volume.

The configuration and method of operation of the audio mixer of the present invention results in an audio mixer which is capable of self-collapsing/self-optimisation by utilising only the components necessary based on the sample rates of audio signals present (input and/or output) at any given time. If there are no audio input signals or outputs signals of a specific sample frequency the audio mixer does not have to waste resources in performing the parts of the process that relate to that specific sample frequency.

The control over which parts of the audio mixer are either utilised or collapsed at any given time may be controlled by the use of flags which label the audio signal with a mix identifier before the mixing step (i.e. before the respective mixing arrangements). A mix indicator such as a "do not mix" flag could be used to tag the audio signal during categorisation of the audio input signals. The flag could be applied, for example, because the conference leader has decided to mute the participant; because the participant has decided to mute themselves; or because the participant did not speak.

The audio mixer may also include an ordering means for ordering the audio input signals by relative volume. This may involve an extra software loop which takes place before the mixing step. Such a loop may reorder the audio signals by comparing the volume of each input against the loudest audio input. The software may then apply a mix indicator such as a "do not mix" flag to all audio signals below a given relative threshold (e.g. below the nth loudest where n could be any positive integer e.g. 4).

As the levels of participation and volume of participants vary throughout the conference and as different participants enter and leave the conference, the audio mixer of the present invention will adjust itself automatically. The step of mixing the audio signals at each of the mixing arrangements may include a step of checking whether or not "mix indicators" are present in metadata which forms part of the audio signals. If a "do not mix" flag is used to label all of the audio signals having a given sample rate, the mix arrangement corresponding to that sample rate will not process any signals. As the relative volumes of participants vary over time, the mix indicators will vary and, depending on the sample rates used by the participants contributing at any given time, the number of mix arrangements which are utilised or collapsed at any given time will therefore also vary.

This differs to the situation in a conventional system such as that of FIG. 1. In the system of FIG. 1, the architecture is not configured to enable a dymanic set up. As discussed previously, the usual procedure for a system such as that of FIG. 1 is to ensure that all audio input signals get up-sampled to the maximum possible sample rate regardless of whether or not any of the participants actually use that sample rate. An alternative would be to configure the FIG. 1 system to work at the maximum sample rate of the participants that are actually present but then to reconfigure the system when a participant with a higher sample rate joins the conference, and reconfigure it again when they leave. Neither prior art scenario is ideal in terms of efficiency or in terms of ease of use.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:
1. An apparatus comprising:
a processor configured to execute software that causes the processor to perform operations including:
mixing audio signals from a plurality of participant devices, including audio signals of different sample rates, the mixing for a corresponding one of the different sample rates comprising:
mixing audio signals having the corresponding sample rate to produce a pre-mixed audio signal of the corresponding sample rate;
resampling pre-mixed audio signals of other sample rates of the different sample rates to convert the pre-mixed audio signals of the other sample rates into a resampled signal for the corresponding sample rate; and
mixing the pre-mixed audio signal for the corresponding sample rate with the resampled signals for the other sample rates to produce a post-mixed output at the corresponding sample rate;

selecting a post-mixed output for a participant device corresponding to an output sample rate chosen by the participant device;

resampling an input audio signal of the participant device to convert the input audio signal of the participant device from an input sample rate to the output sample rate if the participant device chooses an output sample rate which is different than the input sample rate; and subtracting the input audio signal of the participant device from the post-mixed output.

2. The apparatus of claim 1, wherein the operations further include flagging the audio signal of a participant device with a mix indicator.

3. The apparatus of claim 1, wherein the operations further include categorizing a plurality of input audio signals associated with the plurality of participant devices into a plurality of categories, each category corresponding to a supported sample rate.

4. The apparatus of claim 3, wherein categorizing includes decoding each input audio signal of the plurality of input audio signals and routing, based on the sample rate of the decoded signal, the decoded signal to be mixed with signals of the supported sample rate.

5. The apparatus of claim 1, wherein the operations further include assigning a relative volume tag to one or more input audio signals before the input audio signal is mixed.

6. The apparatus of claim 1, wherein the different supported sample rates include one or more of: 8 Khz, 16 Khz, 32 Khz, or 48 Khz.

7. A method of mixing audio signals from a plurality of participant devices including audio signals of different sample rates, the method including:

mixing the audio signals from the plurality of participant devices according to their sample rate by:

pre-mixing audio signals of each sample rate to give a separate pre-mixed output for each sample rate present;

re-sampling each pre-mixed output from its sample rate into resampled outputs of each one or more other sample rates present; and post-mixing each pre-mixed output with each of the one or more resampled signal outputs which have been converted into the same sample rate to generate a separate post-mixed output for each sample rate;

selecting a post-mixed output for a participant device corresponding to an output sample rate chosen by the participant device;

resampling an input audio signal of the participant device to the output sample rate chosen by the participant device if an output sample rate chosen by the participant device is different from an input sample rate of the participant device; and subtracting the input audio signal of the participant device from the post-mixed output.

8. The method of claim 7, further comprising selecting the post-mixed output corresponding to the output sample rate chosen by the participant device before subtracting input audio signal of the participant device from the post-mixed output.

9. The method of claim 8, wherein the input audio signal is resampled to the output sample rate chosen by the participant device before the subtracting if the chosen output sample rate is different from the input sample rate.

10. The method of claim 9, further comprising flagging the audio signal of a participant device with a mix indicator, before the audio signal is mixed.

11. The method of claim 7, further comprising categorizing a plurality of input audio signals into a plurality of categories, each category corresponding to a supported sample rate.

12. The method of claim 11, wherein categorizing the plurality of input audio signals includes decoding each input audio signal and based on the sample rate of the decoded signal, routing each decoded signal to be mixed with signals of that sample rate.

13. The method of claim 7, further comprising assigning a relative volume tag to one or more input audio signals before the input audio signal is mixed.

14. The method of claim 7, wherein the different sample rates supported include one or more of: 8 Khz, 16 Khz, 32 Khz, or 48 Khz.

15. The apparatus of claim 1, wherein the output sample rate chosen by the participant device changes during a call.

16. The apparatus of claim 1, wherein the operations further include assigning respective flags to the audio signals indicative of their respective sampling rates prior to the mixing of the audio signals.

17. The apparatus of claim 1, wherein the operations further include assigning to at least one audio signal a do-not mix flag, wherein the operations further include mixing only the audio signals that are not assigned do-not mix flags.

18. The method of claim 7, wherein the output sample rate chosen by the participant device changes during a call.

19. The method of claim 7, further comprising assigning respective flags to the audio signals indicative of their respective sampling rates prior to the mixing of the audio signals.

20. The method of claim 7, further comprising assigning to at least one audio signal a do-not mix flag, wherein the mixing includes mixing only the audio signals that are not assigned do-not mix flags.

* * * * *